US008774148B2

(12) United States Patent
Hodroj et al.

(10) Patent No.: US 8,774,148 B2
(45) Date of Patent: Jul. 8, 2014

(54) SYSTEM AND METHOD FOR PROVISIONING TELECOMMUNICATIONS SERVICES BETWEEN AN ACCESS POINT AND A TELECOMMUNICATIONS NETWORK AND PROVIDING MISSING INFORMATION NOTIFICATION

(71) Applicants: Samir Hodroj, Bothell, WA (US); Omar Hassan, Kirkland, WA (US)

(72) Inventors: Samir Hodroj, Bothell, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 13/686,619

(22) Filed: Nov. 27, 2012

(65) Prior Publication Data
US 2013/0083785 A1    Apr. 4, 2013

Related U.S. Application Data

(62) Division of application No. 12/395,593, filed on Feb. 27, 2009, now Pat. No. 8,320,344.

(51) Int. Cl.
*H04W 4/00*    (2009.01)

(52) U.S. Cl.
USPC ......................................... 370/338

(58) Field of Classification Search
CPC ......... H04W 8/00; H04W 8/20; H04W 88/00; H04W 88/08; H04W 88/10; H04W 88/12; H04W 88/14; H04W 88/16; H04W 92/00; H04W 92/04; H04W 92/045; H04W 92/10; H04W 92/12; H04W 92/14; H04W 92/16; H04W 92/18; H04W 76/00; H04W 76/007; H04W 4/22

USPC ............... 370/328–339, 351–356; 455/404.1, 455/404.2, 456.1
See application file for complete search history.

(56) References Cited

U.S. PATENT DOCUMENTS

| 4,998,271 A | 3/1991 | Tortola et al. |
|---|---|---|
| 5,513,263 A | 4/1996 | White et al. |

(Continued)

FOREIGN PATENT DOCUMENTS

| CA | 2666472 A1 | 8/2010 |
|---|---|---|
| EP | 1530321 | 5/2005 |

(Continued)

OTHER PUBLICATIONS

International Searching Authority, International Search Report, PCT Application PCT/US2010/025271, mailed Dec. 28, 2010, 3 pages.

(Continued)

*Primary Examiner* — Frank Duong
(74) *Attorney, Agent, or Firm* — Perkins Coie LLP

(57) ABSTRACT

A method and system for selectively provisioning connections between an access point, which supports telecommunications services over an IP network, and a carrier network includes a network connection and a telephone connector suitable for connecting to a landline telephone, a cordless telephone, or a mobile device. The access point sends a provisioning request, which includes identifying information such as a subscriber identifier and a MAC address, to a network controller. The network controller attempts to find a geographic, street, or other address associated with the connection to be provisioned. If an address is not found, the network controller rejects the connection and sends a missing information notification to the access point. After receiving the missing information notification, the access point controls a user indicator to provide error information.

20 Claims, 8 Drawing Sheets

(56) References Cited

U.S. PATENT DOCUMENTS

| | | |
|---|---|---|
| 6,493,629 B1 | 12/2002 | Van Bosch |
| 6,612,489 B2 | 9/2003 | McCormick et al. |
| 6,615,035 B1 | 9/2003 | Lucidarme et al. |
| 6,985,583 B1 | 1/2006 | Brainard et al. |
| 7,110,545 B2 | 9/2006 | Furuya et al. |
| 7,295,556 B2 | 11/2007 | Roese et al. |
| 7,376,221 B1 | 5/2008 | Remy et al. |
| 7,433,673 B1 | 10/2008 | Everson et al. |
| 7,577,458 B2 | 8/2009 | Lin |
| 7,610,062 B2 | 10/2009 | Beeman et al. |
| 7,701,947 B2 | 4/2010 | Cunetto et al. |
| 7,773,579 B1 | 8/2010 | Liu et al. |
| 7,792,093 B2 | 9/2010 | Myhre et al. |
| 7,843,903 B2 * | 11/2010 | Bakke et al. ................ 370/354 |
| 7,864,673 B2 * | 1/2011 | Bonner ........................ 370/230 |
| 8,160,614 B2 | 4/2012 | Shaffer et al. |
| 8,320,344 B2 | 11/2012 | Hodroj et al. |
| 2001/0030235 A1 | 10/2001 | Hedemann et al. |
| 2001/0052006 A1 | 12/2001 | Barker et al. |
| 2002/0147926 A1 | 10/2002 | Pecen et al. |
| 2002/0188581 A1 | 12/2002 | Fortin et al. |
| 2003/0119480 A1 | 6/2003 | Mohammed |
| 2004/0078708 A1 | 4/2004 | Li et al. |
| 2004/0133689 A1 | 7/2004 | Vasisht |
| 2004/0192299 A1 | 9/2004 | Wilson et al. |
| 2004/0203815 A1 | 10/2004 | Shoemake et al. |
| 2005/0026650 A1 * | 2/2005 | Russell ........................ 455/554.1 |
| 2005/0054342 A1 | 3/2005 | Otsuka |
| 2005/0063542 A1 | 3/2005 | Ryu |
| 2005/0078819 A1 | 4/2005 | Hsu et al. |
| 2005/0083911 A1 | 4/2005 | Grabelsky et al. |
| 2005/0094592 A1 | 5/2005 | Schmidt |
| 2005/0114504 A1 | 5/2005 | Marolia et al. |
| 2005/0159149 A1 | 7/2005 | Wen et al. |
| 2005/0160287 A1 | 7/2005 | Mehta et al. |
| 2005/0174992 A1 | 8/2005 | Files et al. |
| 2005/0181805 A1 * | 8/2005 | Gallagher .................. 455/456.1 |
| 2005/0243809 A1 | 11/2005 | Best et al. |
| 2006/0075485 A1 | 4/2006 | Funahashi et al. |
| 2006/0121941 A1 | 6/2006 | Shiflett |
| 2006/0198361 A1 | 9/2006 | Chen |
| 2006/0223498 A1 | 10/2006 | Gallagher et al. |
| 2006/0256800 A1 | 11/2006 | Harrington et al. |
| 2006/0293024 A1 | 12/2006 | Benco et al. |
| 2006/0293038 A1 | 12/2006 | Walter et al. |
| 2006/0293082 A1 | 12/2006 | Neuhaus |
| 2007/0008885 A1 | 1/2007 | Bonner |
| 2007/0026862 A1 | 2/2007 | Hicks et al. |
| 2007/0049342 A1 | 3/2007 | Mayer et al. |
| 2007/0079113 A1 | 4/2007 | Kulkarni et al. |
| 2007/0115900 A1 | 5/2007 | Liang et al. |
| 2007/0123231 A1 | 5/2007 | Kim |
| 2007/0168553 A1 | 7/2007 | Jones et al. |
| 2007/0177562 A1 | 8/2007 | Castrogiovanni et al. |
| 2007/0195803 A1 | 8/2007 | Lowery et al. |
| 2008/0020773 A1 | 1/2008 | Black et al. |
| 2008/0046998 A1 | 2/2008 | Cromer et al. |
| 2008/0095086 A1 | 4/2008 | Linkola et al. |
| 2008/0151866 A1 | 6/2008 | Wu |
| 2008/0160914 A1 | 7/2008 | McRae et al. |
| 2008/0189550 A1 | 8/2008 | Roundtree |
| 2008/0254833 A1 | 10/2008 | Keevill et al. |
| 2008/0311917 A1 | 12/2008 | Marathe et al. |
| 2009/0043876 A1 | 2/2009 | Zhang et al. |
| 2009/0074187 A1 | 3/2009 | Inoue et al. |
| 2009/0085760 A1 | 4/2009 | Lee |
| 2009/0132675 A1 | 5/2009 | Horn et al. |
| 2009/0154701 A1 | 6/2009 | Kosaraju et al. |
| 2009/0163245 A1 | 6/2009 | Oozeki |
| 2009/0215394 A1 | 8/2009 | Dewan |
| 2009/0220216 A1 | 9/2009 | Marsh et al. |
| 2010/0014506 A1 | 1/2010 | Linkola et al. |
| 2010/0014507 A1 | 1/2010 | Linkola et al. |
| 2010/0190492 A1 | 7/2010 | Jiang |
| 2010/0235621 A1 | 9/2010 | Winkler et al. |
| 2010/0265845 A1 | 10/2010 | Lampen |
| 2011/0299686 A1 | 12/2011 | Saboff et al. |
| 2012/0317224 A1 | 12/2012 | Caldwell et al. |

FOREIGN PATENT DOCUMENTS

| | | |
|---|---|---|
| EP | 1865656 | 12/2007 |
| WO | WO-2004/102941 | 11/2004 |
| WO | WO-2006/018047 | 2/2006 |
| WO | WO-2006/062907 | 6/2006 |
| WO | WO-2006/078430 | 7/2006 |
| WO | WO-2006/135285 | 12/2006 |
| WO | WO-2007/015075 | 2/2007 |
| WO | WO-2008/036938 | 3/2008 |
| WO | WO-2010/099229 A2 | 9/2010 |

OTHER PUBLICATIONS

International Searching Authority, Written Opinion, PCT Application PCT/US2010/025271, mailed Dec. 28, 2010, 4 pages.

Buffalo Technology (USA), Inc. "AirStation One-Touch Secure System (AOSS)," Oct. 2004, pp. 1-7. White paper downloaded from www.buffalo-technology.com.

Dontronics. "USB to RJ-11 VoIP Phone Adaptor," Mar. 13, 2006, 7 pages. http://www.dontronics.com/phoneconnector.html.

Wi-Fi Alliance. "Frequently Asked Questions: Wi-Fi Protected Setup," 2006, pp. 1-4.

IVT Corporation. "IVT Leads by Design: Bluetooth PSTN Voice AP," copyright 2006, 3 pages. http://www.ivtcorporation.com/products/ap/index.php.

Telco Systems: A BATM Company. "Access200 Product Family Voice over IP Analog Telephone Adapters," copyright 2005, 2 pages.

"Vonage and Motorola Announce a Co-Branded Internet Telephone Adaptor with Wireless Router," PR Newswire (U.S.), Mar. 14, 2007, 2 pages.

Wi-Fi Alliance. "Wi-Fi Protected Setup," 2007, 2 pages. http:www.wi-fi.org/wifi-protected-setup.

Wi-Fi Alliance. "Wi-Fi Certified™ for Wi-Fi Protected Setup™. Easing the User Experience for Home and Small Office Wi-Fi® Networks," © 2007, 2008, 2009, 14 pages.

Belkin International, Inc. Press Release, Jul. 11, 2007, with "Belkin's New N1 Vision Wireless Router User Manual," 117 pages.

Bertolucci, Jeff. "Vonage's Flashy V-Portal Offers Easier VoIP Setup," PC World Communications, Apr. 1, 2008, 1 page.

Greene, Tim. "Vonage Tailors VoIP for Small Firms: Flat-fee Dialing Includes Local, Long-Distance Calls," Network World, Jun. 23, 2003, 2 pages.

Helander, Johannes et al. "Secure Web Services for Low-Cost Devices," Proceedings of the Eighth IEEE International Symposium on Object-Oriented Real-Time Distributed Computing (ISORC'05), May 18-20, 2005, pp. 130-139.

Honan, Mathew. "I Am Here: One Man's Experiment with the Location-Aware Lifestyle," Wired Magazine: 17.02. Jan. 19, 2009, pp. 1-7. http://www.wired.com/gadgets/wireless/magazine/17-02/lp_guineapig?currentPage=all.

Houghton, Mike. "Cellular Modems: 3G Access on the Move," Enterprise IT Planet, May 25, 2006, 4 pages. www.enterpriseitplanet.com.

IEEE-SA Standards Board, IEEE Std. 802.11, 1999 Edition, "Part 11: Wireless LAN Medium Access Control (MAC) and Physical Layer (PHY) Specifications," 37 pages.

Lazarowitz, Elizabeth. "Easy Call: Phoning Via Web," New York Daily News, Feb. 5, 2007, 3 pages.

Belkin International, Inc. "N1 Wireless Router User Manual," 2007, 104 pages.

Shaw, Keith. "VoIP Invades the Home Network," Network World, Aug. 30, 2004, 1 page.

International Search Report and Written Opinion, International Application No. PCT/US2007/082010, Applicant: T-Mobile USA, Inc., mailed Jun. 16, 2008, 10 pages.

(56) References Cited

OTHER PUBLICATIONS

International Search Report and Written Opinion, International Application No. PCT/US2007/082285, Applicant: T-Mobile USA, Inc., mailed Mar. 10, 2008, 10 pages.

International Search Report and Written Opinion, International Application No. PCT/US2009/051072, Applicant: T-Mobile USA, Inc., mailed Nov. 6, 2009, 12 pages.

International Search Report and Written Opinion, International Application No. PCT/US2010/026715, Applicant: T-Mobile USA, Inc., mailed Oct. 18, 2010, 10 pages.

European Patent Office, Supplementary European Search Report and Opinion, EP Application 07854249, mailed Jun. 4, 2012, 6 pages.

* cited by examiner

SYSTEM AND METHOD FOR PROVISIONING TELECOMMUNICATIONS SERVICES BETWEEN AN ACCESS POINT AND A TELECOMMUNICATIONS NETWORK AND PROVIDING MISSING INFORMATION NOTIFICATION

CROSS-REFERENCES TO RELATED APPLICATIONS

This application is a divisional application of U.S. patent application Ser. No. 12/395,593, filed on Feb. 27, 2009, and entitled "SYSTEM AND METHOD FOR PROVISIONING TELECOMMUNICATIONS SERVICES BETWEEN AN ACCESS POINT AND A TELECOMMUNICATIONS NETWORK AND PROVIDING A MISSING INFORMATION NOTIFICATION," which is hereby incorporated herein in its entirety by reference.

BACKGROUND

In this digital age, modern telecommunications service providers and device manufacturers are increasingly relying on public and/or private Internet Protocol (IP) networks, including the Internet, as a core part of their technology. For example, many telecommunications service providers now offer a suite of Voice over Internet Protocol (VoIP) services, as well as various data services, that utilize IP networks and/or IP-based wireless access networks for at least part of their infrastructure. For example, these IP-based wireless access networks may be based on IEEE 802.16 (WiMAX), IEEE 802.20 Mobile Broadband Wireless Access (MBWA), Ultra Wideband (UWB), 802.11 wireless fidelity (Wi-Fi), Bluetooth, and similar standards. Likewise, device manufacturers are producing a new generation of mobile devices, such as wireless handhelds, wireless handsets, mobile phones, personal digital assistants, notebook computers, and similar devices. These devices are enabled to send and receive information using IP-based telecommunications services. In fact, many of today's modern mobile devices are able to function as "dual-mode devices" that take advantage of both cellular network technologies and IP-based technologies.

Unlicensed Mobile Access (UMA) technology has developed as part of this trend to incorporate IP solutions into mobile device telecommunications systems. UMA technology has been accepted into Release 6 of the 3rd Generation Partnership Project (3GPP) and is also referred to as Generic Access Network (GAN) technology. In various implementation schemes, UMA allows wireless service providers to merge cellular networks (such as Global System for Mobile Communications (GSM) networks) and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, similar to the way that they can transparently move between cells within the cellular network. Seamless in-call handover between the IP-based wireless network and the cellular network ensures that the user's location and mobility do not affect the services delivered to the user.

At an operational level, UMA technology effectively creates a parallel radio access network, the UMA network, which interfaces with the mobile core network using standard mobility-enabled interfaces. For example, UMA can replace a system's GSM radio technology on the lower protocol layers with a wireless Local Area Network (LAN), or similar technology. A call or other communication may be tunneled to the Mobile Switching Center (MSC) of a mobile service provider via an access point (e.g., a Wi-Fi access point or a femtocell connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

DETAILED DESCRIPTION

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description.

I. SAMPLE NETWORK CONFIGURATIONS

Figure 1:
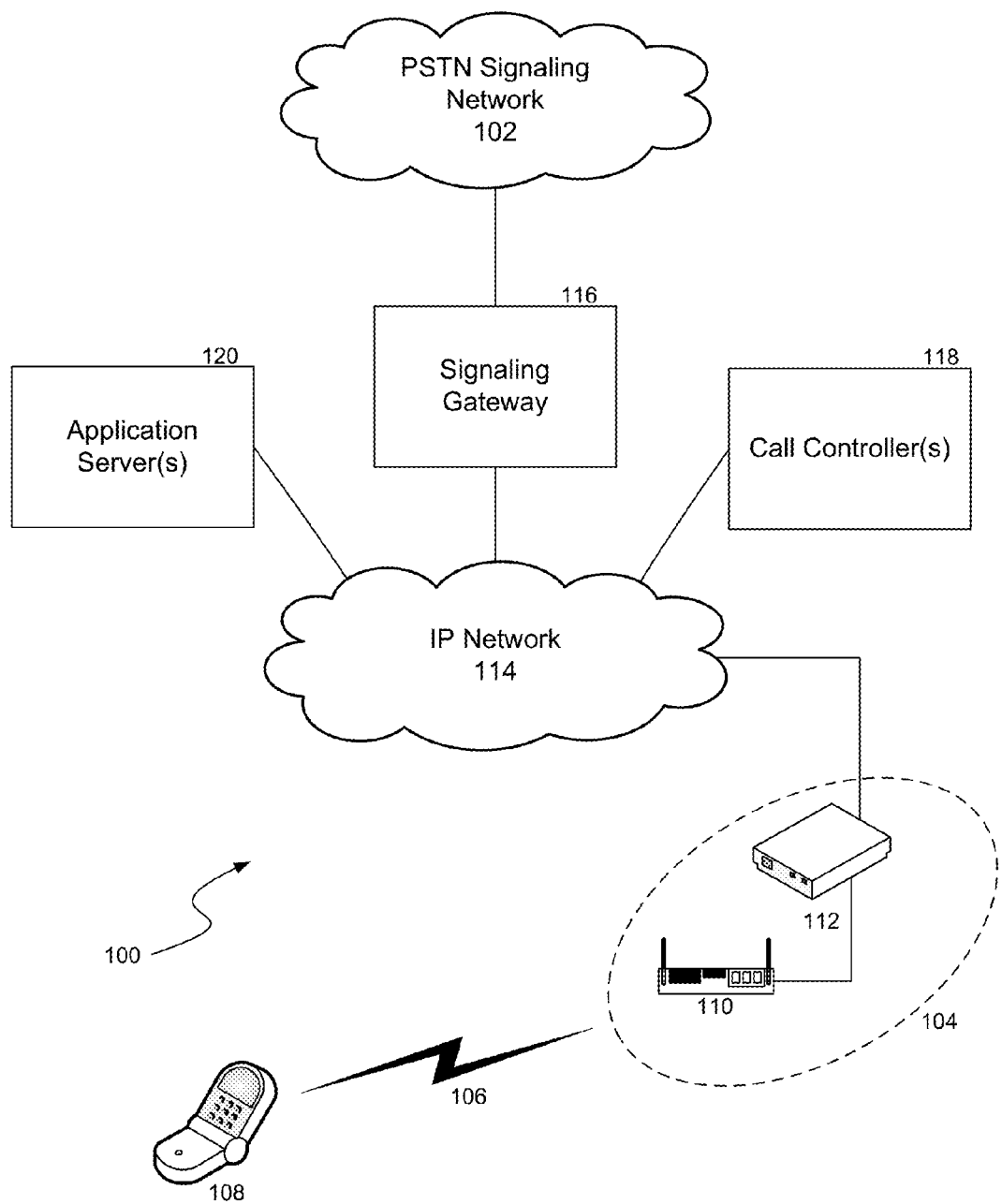
FIG. 1 illustrates aspects of a sample network system that allows VoIP-based communications in conjunction with a public switched telephone network (PSTN).

FIG. 1 illustrates aspects of a sample network system 100, including multiple telecommunications networks, that allows VoIP-based communications in conjunction with a public switched telephone network (PSTN) 102. As discussed herein, a telecommunications network may include any network suitable for enabling transmission of signals over a distance. Thus, the telecommunications networks discussed may be wired or wireless, circuit-switched or packet-switched, and may use licensed, semilicensed, or unlicensed wireless bands. The network system 100 includes at least one access point 104. The access point 104 may be public or private and may be located, for example, in a subscriber's residence (e.g., home, apartment, or other residence), in a public location (e.g., coffee shops, retail stores, libraries, or schools), or in corporate or other private locations. In the sample system of FIG. 1, the access point 104 can accept communications 106 from at least one suitably configured telecommunications device 108 (e.g., a VoIP device). Various examples of network technology that may be involved in communicating between the telecommunications device 108 and the access point 104 include the IEEE 802.16 (WiMAX), IEEE 802.20 Mobile Broadband Wireless Access (MBWA), Ultra Wideband (UWB), 802.11 wireless fidelity (Wi-Fi), and Bluetooth standards, or other similar standards. The access point 104 includes a wireless router 110 and a broadband modem 112 that enable connection to an Internet Protocol (IP) network 114. The IP network 114 may comprise one or more public networks or private networks, or a combination of public and private networks.

Through communications 106, the access point 104 receives IP packets from the telecommunications device 108. These IP packets are then transported through the IP network 114 to a signaling gateway 116, which in the example of FIG. 1 is operated by a telecommunications service provider. At the signaling gateway 116, the IP packets are converted to a traditional phone service signal. The phone service signal is then conveyed to a recipient via the PSTN 102.

The network system 100 of FIG. 1 also includes a call controller 118 that provides call logic and call control functions for communications sent through the system and an application server 120 that provides logic and execution of one or more applications or services offered by the telecommunications service provider, such as applications that implement various access and security rules. In this example, a telecommunications service provider manages both the call controller 118 and the application server 120.

Figure 2:
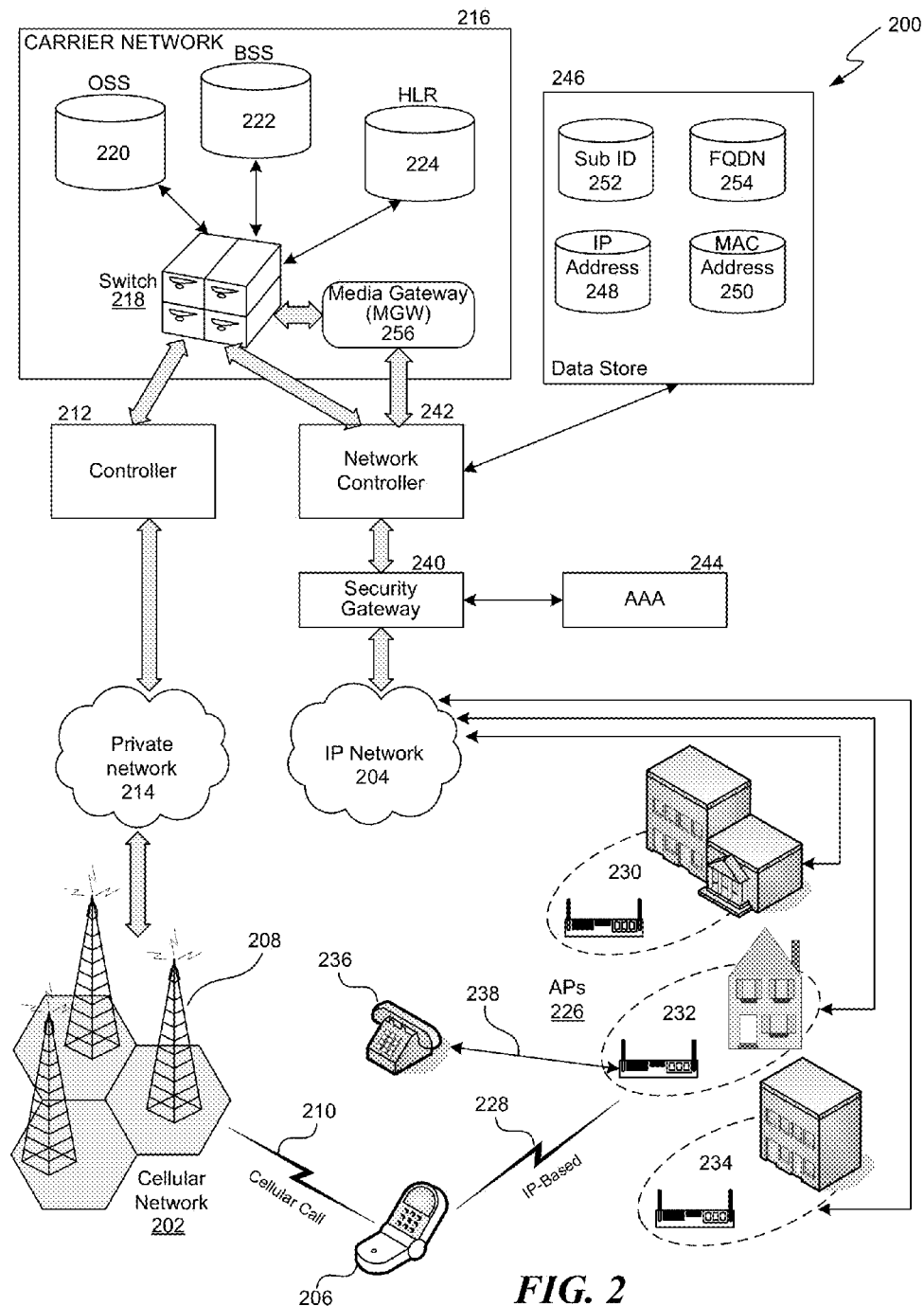
FIG. 2 illustrates a sample converged wireless network system that combines a cellular network with an IP-based wireless telecommunications network.

FIG. 2 illustrates a sample converged wireless network system that combines a cellular network with an IP-based wireless telecommunications network. In general, with respect to the network system described in FIG. 2, because the same cellular protocols are used in communications involving IP access points as with traditional radio towers, the cellular service provider maintains a large degree of system compatibility even though it uses an IP-based network. For example, the various systems of the cellular service provider that deliver content and handle mobility may not even need to be aware that a subscriber's mobile device is on an IP-based wireless telecommunications network. Instead, the various systems of the cellular service provider assume that the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed, and/or unlicensed spectrum access—such as spectrums for IP-based wireless telecommunications). Likewise, at a protocol level, because the same cellular protocols are used in communications involving the IP access points as with traditional radio towers, the cellular service provider maintains a large degree of system compatibility even though it uses an IP-based network.

Referring to FIG. 2, a sample network system 200 combines a cellular telephone network 202 (such as a GSM network) and an IP network 204 in a UMA-type configuration that provides service to the user of a mobile device 206 or a landline telephone 236. Such service may include voice services and also supplementary services, such as call forwarding, call waiting, text messaging services (e.g., Short Message Service (SMS)), and data-based services like ringtone downloads, game downloads, picture messaging, email, and web browsing. Further, since the mobile device 206 is connected to an IP network, all manner of data services available over such networks may be provided to the mobile device 206.

In general, the described network system 200 accepts registration requests from the mobile device 206. The accepted registration requests can be requests to either the cellular telephone network 202 or to the IP network 204. Accordingly, to handle requests to the cellular telephone network 202, the cellular telephone network 202 includes one or more cell towers 208 that are configured to accept cellular communications 210 from the mobile device 206. The cell towers 208 are connected to a base station controller 212 (such as a base station controller/radio network controller (BSC/RNC)) via a private network 214. The private network 214 can include a variety of connections (not shown) such as T1 lines, a wide area network (WAN), a local area network (LAN), various network switches, and other similar components.

The base station controller 212 controls communication traffic to a carrier network 216, where all communications are managed (including both cellular and IP-based communications). Components of the carrier network 216 in this example include a switch (e.g., a mobile switching center (MSC)) 218, which is configured to control data/call flows and perform load balancing, as well as other functions. The carrier network 216 may also include a variety of system databases, such as an operation support subsystem (OSS) database 220, a business support system (BSS) database 222, and a home location register (HLR) 224, or other central subscriber database that contains details of a carrier's subscribers for billing, call logging, etc.

The sample network system 200 further includes one or more access points 226 that can accept IP-based communications 228 from the mobile device 206. For example, each access point 226 can be configured as part of a network in one or more locations such as a public network 230, a home network 232, or a private business network 234. Each access point 226 is coupled to the IP network 204 through, for example, a broadband connection (not shown), such as a Digital Subscriber Line (DSL) modem, a cable modem, a satellite modem, or any other broadband device. The access points may communicate with mobile devices wirelessly via any licensed, semilicensed or unlicensed spectrum (e.g., a WiFi access point or a femtocell access point), or may provide only wired communication.

The access points 226 may be configured to provide telecommunications services to any type of customer-premises equipment (CPE). As used herein, a CPE is any terminal or equipment located at a subscriber's premises (e.g. in a home or office) and connected with a carrier telecommunications network. CPE may include, for example, a landline telephone, a cordless telephone, a mobile device operating within the home, a broadband modem, or a set-top box.

Figure 3:
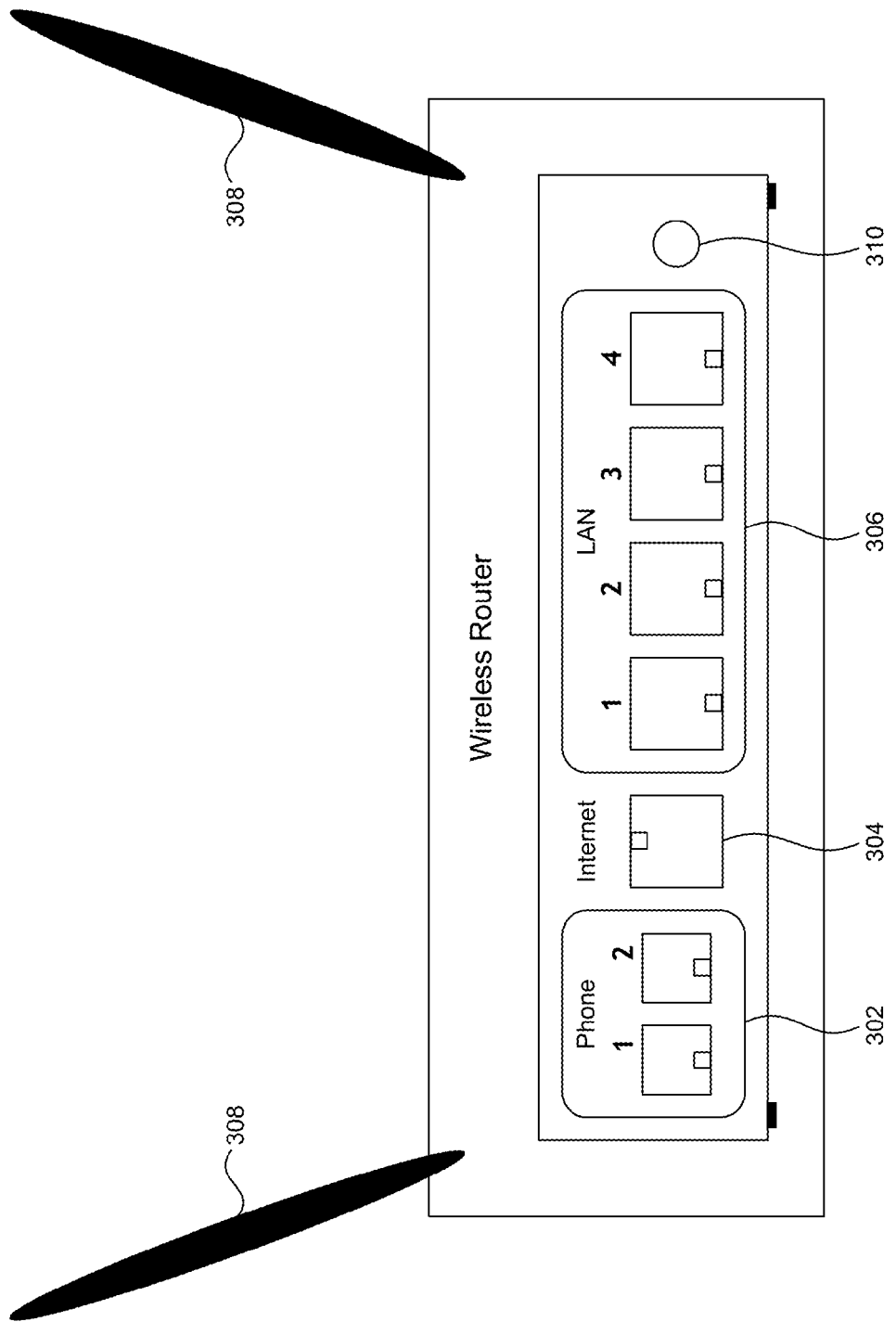
FIG. 3 illustrates the back panel of an access point capable of supporting two landline telephones in addition to a wireless connection.

In one configuration, the access points 226 may be configured with one or more landline telephone connectors. For example, FIG. 3 illustrates the back panel of an access point 226 capable of supporting two landline telephones (e.g., traditional landline telephones and cordless telephones) in addition to a wireless connection. The access point 226 includes a WAN connector 304, which connects the access point 226 to the IP network 204. The access point 226 also includes a plurality of data connectors 306 that connect to computers or other devices and are used to carry data traffic. The access point 226 may have one or more antennas 308 that support wireless connections for data transmission, such as for an IP-based telecommunications connection. Alternatively, the access point 226 may have no antennas and may only support wired connections. The access point 226 also includes two telephone connectors 302, which can accept a cable connecting to a landline telephone. In most cases, this is implemented as an RJ-11 connector, but one skilled in the art will appreciate that other standard connectors could be used, including an RJ-14, RJ-25, or RJ-45 connector. The access point 226 may also include a port, slot, or socket (shown in FIG. 5) configured to accept an identifier module that stores data associated with a subscriber or a voice connection, such as a subscriber identifier (e.g., an International Mobile Subscriber Identifier (IMSI)). The access point 226 may also support an alternate identifier, such as a software Subscriber Identity Module (SIM) or other identifier. The identifier module may include a tamper-resistant memory that may store information used to enable a device to connect to the carrier network 216 and authenticate the device to the carrier network 216. For example, the subscriber identifier may be a unique or rare secure identification number associated with a subscriber, an organization, or a calling plan. In a UMA system, the slot is configured to accept a SIM card similar to those used for GSM mobile devices. The access point 226 may include a separate slot for each telephone connector 302 to allow each landline telephone 236 to be separately authorized.

Alternatively, the telephone connectors 302 may be implemented as a local wireless connection using licensed, semi-licensed, or unlicensed wireless bands. For example, the access point 226 may include a radio as the telephone connector, which is configured to communicate directly with a cordless telephone handset using an unlicensed wireless band. Alternatively or additionally, the access point 226 may communicate with a mobile device (e.g., a cellular telephone or smartphone) using a licensed band. In either configuration, the access point 226 may then be configured to provide telecommunications services using connection information (e.g., telephone number, subscriber identifier, etc.) associated with the access point 226, rather than connection information associated with the cordless telephone handset/mobile device/etc. This implementation has the advantage of allowing a user to use a cordless telephone handset without requiring a separate base station. It also allows a user to use a mobile device as a handset even if the mobile device is not configured to directly connect to the carrier network.

Figure 5:
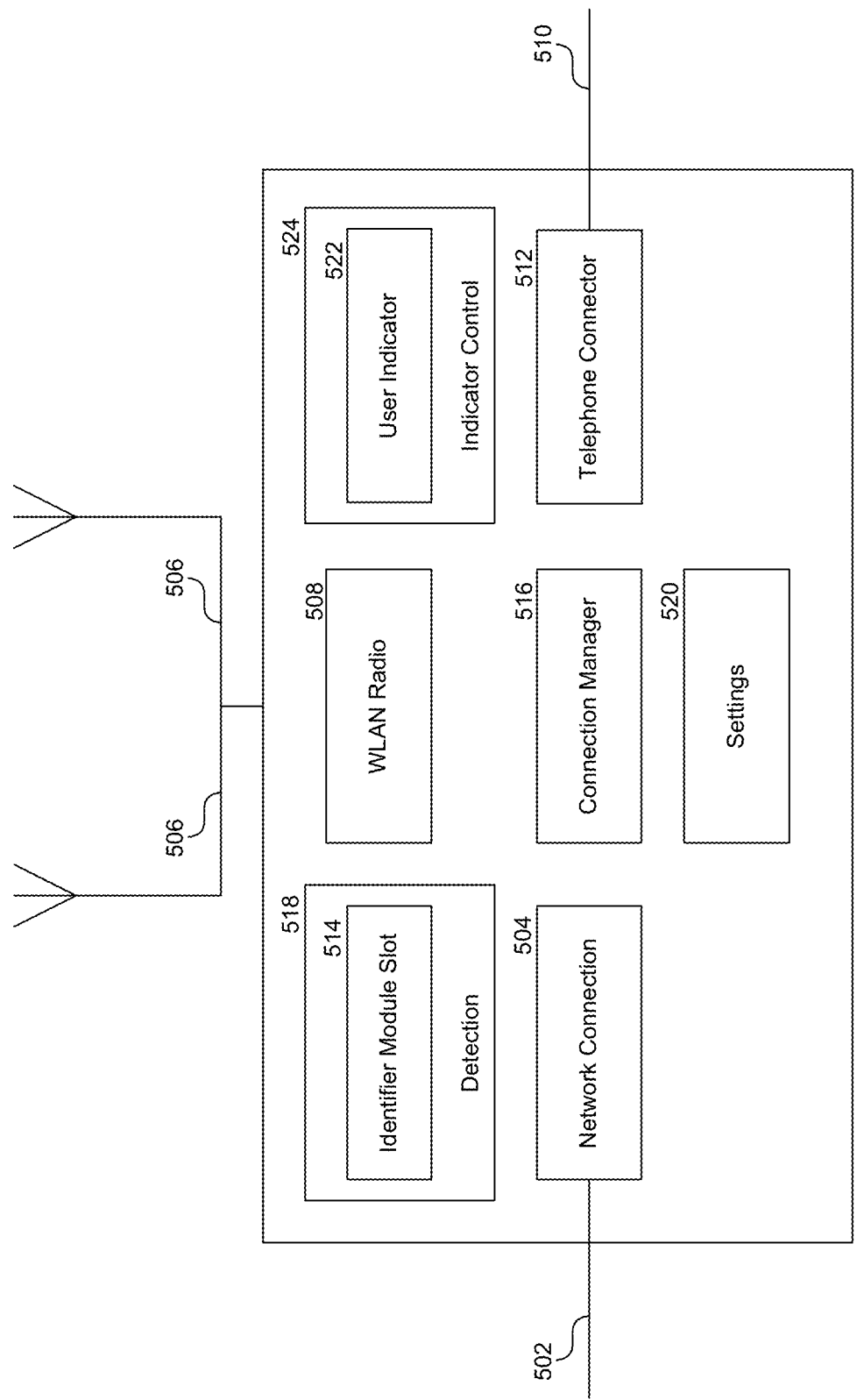
FIG. 5 illustrates a block diagram of an access point capable of selectively provisioning a connection for a landline telephone.

The access point 226 may also include one or more user indicators to provide status information or error notifications to a user (shown in FIG. 5). For example, the access point 226 may provide information by enabling, disabling, or changing a color of one or more indicator lights 310. Alternatively, the access point 226 may include a display screen (e.g., an LCD screen) capable of displaying text describing status or error conditions. The access point 226 may also provide other user-perceptible indicators, such as an audible indicator.

Returning to FIG. 2, the landline telephone 236 is connected to the access point 226 with a standard wired connection 238 to one of the telephone connectors 302. In this configuration, the access point 226 converts the incoming analog voice signal into digital form and encapsulates the signal for transmission over the IP network 204. As discussed below, the access point 226 also communicates with a security gateway 240 or a network controller 242 to enable the landline telephone to make calls through the carrier network 216. The access point 226 is generally configured to provision a separate connection for each telephone connector 302.

In some configurations, the access point 226 includes components to provide the connected landline telephone 236 with a simulation of a Plain Old Telephone Service (POTS) network. For example, the access point 226 may act as a POTS end office by providing a dial tone when the user lifts the telephone off the hook if there is a connection to the carrier network. The access point may also provide the calling name and number for an incoming call by translating the data from the IP-based telecommunications format to the format used by a POTS caller ID service. It may similarly provide the ability to toggle between calls for call waiting using the standard flash hook by translating the POTS signal into the equivalent UMA or GSM format. The access point 226 may also provide a standard POTS stutter dial tone to indicate new voice mail. The access point 226 could do this by periodically querying the carrier network 216 to determine whether new voice mail is available and providing the stutter dial tone if the carrier network indicates that there is new voice mail. Alternatively, or in addition to the stutter dial tone, the access point 226 may include an indicator (e.g., a flashing light) to notify the user that new voice mail is available.

When the mobile device 206 attempts to access the IP network 204 (i.e., to initiate an IP-based communication), information (e.g., data, voice, SMS, etc.) is initially formatted in the native protocol of the cellular telephone network 202 and then encapsulated into IP packets, which are transmitted to the access point 226 and routed through the IP network 204 to the security gateway 240. In contrast to non-IP communication requests, such transmissions bypass the existing network of radio towers of the cellular telephone network 202. Similarly, when the landline telephone 236 attempts to make a call through the IP network 204, the access point 226 encapsulates the voice signal into IP packets that are then routed through the IP network 204 to the security gateway 240. The security gateway 240 controls access to the network controller 242, which communicates with a data store 246 used to log and access communications data. Thus, one function of the network controller 242 is to manage access to the carrier network 216 when dealing with an IP-based communication (in a similar manner that the base station controller 212 does for a non-IP-based communication).

In one example, authentication of a request for access by the mobile device 206 or the access point 226 over the IP network 204 is handled by the security gateway 240, which communicates with an authentication, access, and authorization (AAA) module 244 that is most likely associated with the carrier network 216. Challenges and responses to requests for access by the mobile device 206 or the access point 226 are communicated between the HLR 224 and the AAA module 244. When authorization is granted, the security gateway 240 communicates the assignment of an IP address to the mobile device 206 or the access point 226 that requested access. Once the security gateway 240 passes the IP address to the mobile device 206 or the access point 226, the public IP address assigned to the device is passed to the network controller 242.

In another authorization example, upon receiving identification information from the mobile device 206, the network controller 242 may query the data store 246 to determine whether the mobile device 206 is authorized to access the IP network 204. Sample identifiers that may be utilized to determine whether access should be granted include a media access control (MAC) address associated with an access point, a mobile device or subscriber identifier (such as an IMSI), an IP address (or "Public IP address") associated with the access point, a fully qualified domain name (FQDN), or other similar types of information. The data store 246 may be a single database, table, or list, or a combination of databases, tables, or lists, such as one for IP addresses 248, one for MAC addresses 250, one for subscriber identifiers 252, and one for FQDNs 254. The data store 246 may include "blocked" identifiers as well as "authorized" identifiers. Authorized accesses to the IP-based wireless telecommunications network may be maintained by the network controller 242 in an authorized session table or similar data construct.

In some cases, the signaling portion of a communication (e.g., the portion of the communication that governs various overhead aspects of the communication such as, for example, when the call starts, when the call stops, initiating a telephone ring, etc.) is routed through the network controller 242 to the switch 218, while the voice bearer portion of the communication (e.g., the portion of the communication that contains the actual content (either data or voice information) of the communication) is routed through the network controller 242 to a media gateway 256. In other words, the media gateway 256 controls the content flow between the service provider and the mobile device 206, while the switch 218 controls the signaling flow (or controls the overhead-related flow) between the service provider and the mobile device 206.

Figure 4:
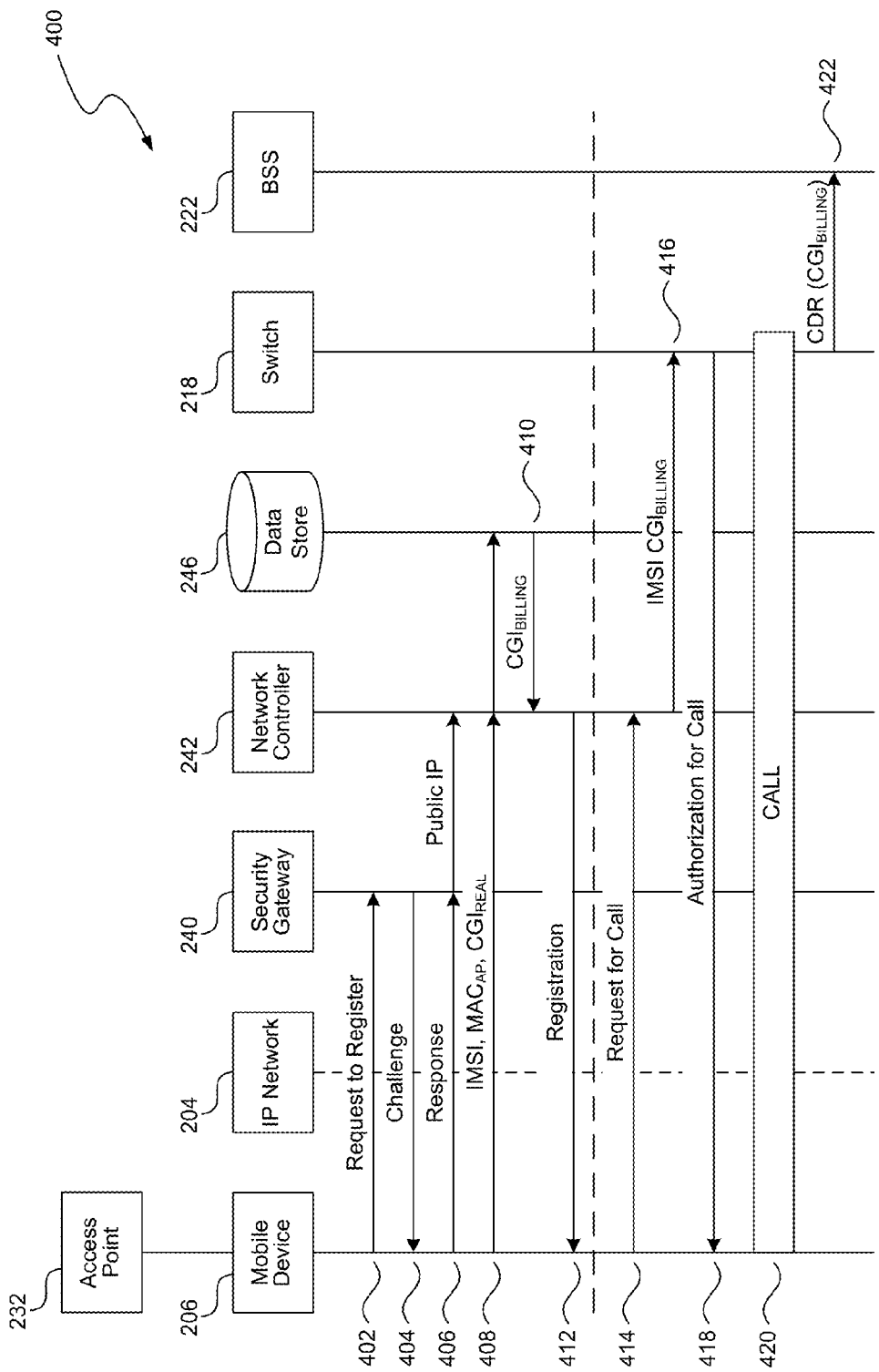
FIG. 4 illustrates a timing diagram of actions in a UMA network for provisioning telecommunications services.

FIG. 4 illustrates an example of a timing diagram 400 of steps in a UMA network for provisioning telecommunications services, including registering a mobile device and facilitating a call from the mobile device 206. However, as noted herein, the disclosed system is not limited to UMA services and may include any other service suitable for provisioning telecommunications services. For example, the disclosed system may also be configured to provide access using licensed frequency bands. The call registration process is illustrated by communication steps 402-412, while the calling process is illustrated by communication steps 414-422. The steps of the timing diagram 400 may also be used to support calls from the landline telephone 236 connected to the access point 226. In those cases, the registration and calling processes are initiated by the access point 226, rather than the mobile device 206.

At step 402, the mobile device 206 or the access point 226 initiates a call by sending a request to register to the security gateway 240. The security gateway 240 replies with an authentication challenge communicated back to the mobile device 206 or access point 226 at step 404. At step 406, the mobile device 206 or access point 226 responds to the authentication challenge with a response communicated to the security gateway 240. Also at step 406, the security gateway 240 communicates a public IP address that is assigned to the access point 226 to the network controller 242. At step 408, the mobile device 206 communicates an identifier (such as the IMSI ID) and a Cell Global Identifier (CGI) record ($CGI_{REAL}$) to the security gateway 240. The CGI record is an identifier that uniquely identifies a base station initiating a call through the core network. In a UMA connection from a mobile device 206, $CGI_{REAL}$ is the CGI record for the nearest cell tower 208. For a connection from an access point 226, $CGI_{REAL}$ may be a hard-coded value unique to the access point 226 or may be selected based on other criteria, such as geographic location. Also at step 408, the security gateway 240 transmits the subscriber identifier, $CGI_{REAL}$, and the MAC address ($MAC_{AP}$) from the access point 226 to the network controller 242. In response, the network controller 242 communicates with the data store 246, which replies with $CGI_{BILLING}$ at step 410. $CGI_{BILLING}$ is used by the network to ensure that the call is billed correctly.

The network controller 242 may also perform other types of authentication during this step. For example, current Federal Communications Commission regulations require that VoIP connections must be associated with a physical or geographic address (e.g., a street address) in order to enable enhanced 911 emergency services (E911). Thus, the network controller 242 may also confirm that the data store 246 includes an E911 address for the access point 226 before allowing the voice connection. For example, the network controller 242 may use the subscriber identifier as an index to look up an E911 address and reject the connection if no address is found. In some implementations, when provisioning a connection from a mobile device, the network controller 242 may use identifying information associated with the access point (e.g., the MAC address) to find the E911 address.

At step 412, the network controller 242 communicates a registration completion message to the mobile device 206. If the connection is rejected, the network controller 242 responds with a rejection message. In particular, if an E911 address was not found, the network controller 242 provides a missing information notification message informing the access point 226 that required information was not found. In a UMA or GAN system, the missing information notification message is a geolocation unknown message.

Once the registration is completed, the mobile device 206 or the access point 226 communicates with the network controller 242 to request a call at step 414. At step 416, the network controller 242 communicates the subscriber identifier and $CGI_{BILLING}$ to the switch 218. The switch 218 authorizes the call at step 418 such that the device can communicate over a communication channel established through the switch 218 at step 420. At step 422, the call is terminated and the switch 218 communicates a call data record (CDR) to the billing system (e.g., the BSS database 222).

II. SELECTIVELY PROVISIONING CONNECTIONS BETWEEN AND ACCESS POINT AND THE NETWORK

A method and system for selectively provisioning connections between an access point and the carrier network is disclosed. The access point 226 can be used to provision a connection for a landline telephone, a cordless telephone, or any mobile device. The access point 226 sends a provisioning request that includes identifying information such as a subscriber identifier and a MAC address, to the network controller 242. The network controller 242 attempts to find a geographic address associated with the connection to be provisioned. If an address is not found, the network controller 242 rejects the connection and sends a missing information notification to the access point 226. After receiving the missing information notification, the access point 226 controls a user indicator (e.g., an indicator light, a display screen, an audible indicator, etc.) to provide error information. A user can use the error information to more quickly troubleshoot connection problems.

FIG. 5 illustrates a block diagram of an access point 226 capable of selectively provisioning a connection for a landline telephone 236. The access point 226 includes a network connection component 504 that provides an interface between the access point 226 and the IP network 204. The network connection component 504 is connected to the network through a network connection 502, which may be a hardwired connection (e.g., a cable or DSL connection) or a wireless connection (e.g., a WiMAX connection). The network connection component 504 may be of any type known in the art, such as an Ethernet network chip. The connection is supported by a standard network protocol stack, such as a TCP/IP stack (not shown). Similarly, the access point 226 includes a telephone connector component 512, which is connected to a telephone cord 510. The telephone connector component 512 receives a landline telephone signal through the telephone cord 510 and passes it to other processing components (not shown). Alternatively, the telephone connector 512 may be a wireless connection using unlicensed spectrum to connect to a cordless phone or a mobile device. The other processing components can include, for example, a component to convert the analog signal into a digital form and encapsulate the data for transmission. The access point 226 may also have a wireless LAN (WLAN) radio component 508, which is connected to one or more antennas 506. The WLAN radio component 508 provides wireless networking support to enable mobile devices 206 to connect as described above. The access point 226 may include other radio components instead of, or in addition to, the WLAN radio component 508. For example, the access point 226 may include radio components capable of operating in licensed frequency bands using wireless standards such as GSM or CDMA2000. The access point 226 may also include radio components capable of operating in unlicensed frequency bands using other wireless standards, such as UWB or Digital Enhanced Cordless Telecommunications (DECT). The access point 226 may also have an identifier module slot 514, which is configured to receive an identifier module having a tamper-resistant memory. The tamper-resistant memory stores subscriber or connection-specific data. In one implementation, this could include a SIM card similar to the cards used in, e.g., a GSM mobile device. Alternatively, the access point 226 may have a software SIM incorporating an IMSI or other identifier. The access point 226 also includes a settings component 520, which stores configuration settings for the access point 226, such as security settings and the IP address of the security gateway 240.

The identifier module includes information that defines the subscriber's identity. The identity could include any of the identification information described above, such as subscriber identifier (e.g., IMSI, mobile identifier number (MIN), or similar identifiers), equipment identifiers (e.g., MAC address, electronic serial number (ESN), or similar identifiers), FQDN, IP address, or a combination of these. The identity could also be defined by a value algorithmically generated from the identification information, such as the exclusive OR, addition, or concatenation of two or more numbers.

The identifier module slot 514 is associated with a detection component 518, which uses electrical or mechanical means to determine whether an identifier module is present in the identifier module slot 514. Further details may be found in assignee's co-pending U.S. application Ser. No. 12/175,414, entitled "SYSTEM AND METHOD FOR SELECTIVELY PROVISIONING TELECOMMUNICATIONS SERVICES BETWEEN AN ACCESS POINT AND A TELECOMMUNICATIONS NETWORK USING A SUBSCRIBER IDENTIFIER," which is hereby incorporated by reference.

The access point 226 also has a connection manager component 516. The connection manager component 516 provisions call connections between the access point 226 and the carrier network 216 when the access point 226 determines that the connection should be set up. The connection manager 516 executes the call setup steps described above for FIGS. 1-4, such as contacting the security gateway 240. In a UMA network, the connection manager component 516 implements a UMA client for connecting with the carrier network 216.

The access point 226 also includes a user indicator component 522. As discussed above with reference to FIG. 3, the user indicator component 522 may include one or more indicator lights, a display screen, an audible indicator, or any other component suitable for producing a user-perceptible notification. For example, the indicator component may be a single or multicolor LED, an iconic or alphanumeric LCD display (e.g., one or more rows or individual alphanumeric displays, such as a single row displaying a scrolling line of text), an Organic Light Emitting Diode (OLED) display, a projection display, a Cathode Ray Tube (CRT) display, a plasma display, a Liquid Crystal on Silicon (LCoS) display, or a laser display. The indicator component may also include an audible component, such as a speaker, an electrical or electromechanical horn, or a bell. The user indicator component 522 is controlled by an indicator control component 524, which is configured to control the user indicator component 522 to provide status or error information to a user. The indicator control component 524 may be implemented as software or firmware executed by a processor that receives the missing information notification and provides a signal to control the user indicator component 522. In particular, the indicator control component 524 may control the user indicator component 522 to provide an error message in response to receiving a missing information notification from the network controller 242 in response to a provisioning request. Alternatively, the indicator control component 524 may control the user indicator component 522 to provide a simple error notification having a predefined meaning (e.g., a bell noise, a change in the color of an indicator LED). Thus, an existing visual indicator, e.g., power LED, may turn color or flash in response to the missing information notification.

Figure 6:
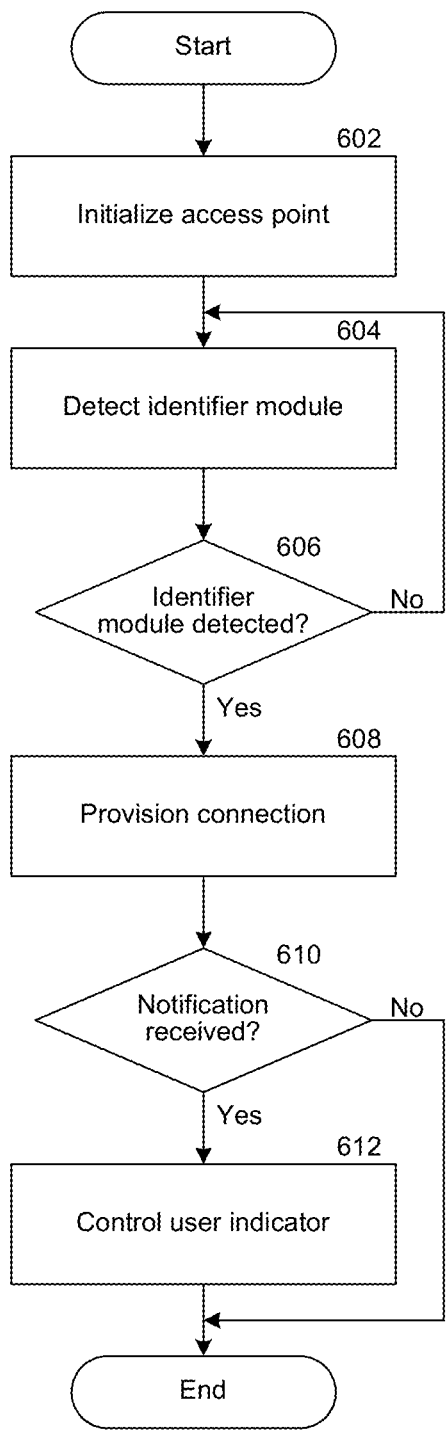
FIG. 6 illustrates a process for selectively provisioning telecommunications services between a landline telephone and an IP-based network.

FIG. 6 illustrates a process 600 for selectively provisioning a connection between a landline telephone and an IP-based network. The process begins at block 602, where the access point starts up and initializes. During this step, the access point 226 executes initialization tasks, such as initiating the WLAN radio component 508 to provide wireless networking and the data connectors 306 to provide wired data networking. In this step, the access point 226 also determines whether it is connected to the IP network 204 through the network connection component 504. This may include detecting a physical connection to the WAN connector 304 or determining whether the access point 226 has an IP address for the WAN connection.

Once the access point 226 is running and the above (optional) checks are performed, the system proceeds to block 604, where it attempts to detect an identifier module in the identifier module slot 514 using any method known in the art, such as the methods discussed above. Alternatively, the system attempts to determine another identifier from, for instance, a software SIM. The system then proceeds to decision block 606, where the system selects a processing branch depending on whether the detection component 518 found an identifier module. If an identifier was detected, the system proceeds to block 608, where the connection manager component 516 sends a request to provision the connection. If a telephone connection was not detected, the system returns to block 604, where it again attempts to detect the identifier module. If the connection is being provisioned for a mobile device, the system may instead use the subscriber identifier associated with the mobile device. In this case, the system may verify that the mobile device provided the subscriber identifier rather than attempt to find the identifier module in the access point 226.

As noted above, in addition to detecting an identifier module in the identifier module slot 514, the system in step 606 may perform other checks. For example, the access point may transmit the stored subscriber identifier (e.g., IMSI) to the network for validation. Alternatively or additionally, the network may confirm that a street address is associated with the access point (e.g., by comparing the IMSI to a stored record for an address associated with that IMSI) for E911 validation. In some configurations, the access point 226 does not perform these checks and proceeds directly to decision block 610 after initialization is complete.

Processing then proceeds to decision block 610, where the system determines if a missing information notification was received in response to the provisioning request. As discussed in greater detail below, the network provides a missing information notification in response to a provisioning request from a device that does not have an associated street, geographic, or E911 address stored in a network database. If a missing information notification is received, processing proceeds to block 612, where the system controls the user indicator. This may include enabling, disabling, or changing the color of one or more indicator lights in a predetermined way to indicate the error. Alternatively, the system may provide a text message to a display screen in response to receiving the missing information notification. The text may provide user instructions (e.g., text directing the user to call a customer service telephone number or access a specified network location via a displayed URL) or otherwise indicate to the user the nature of the problem and/or describe how to correct the problem. After controlling the user indicator, or if a notification was not received, the process exits.

Figure 7:
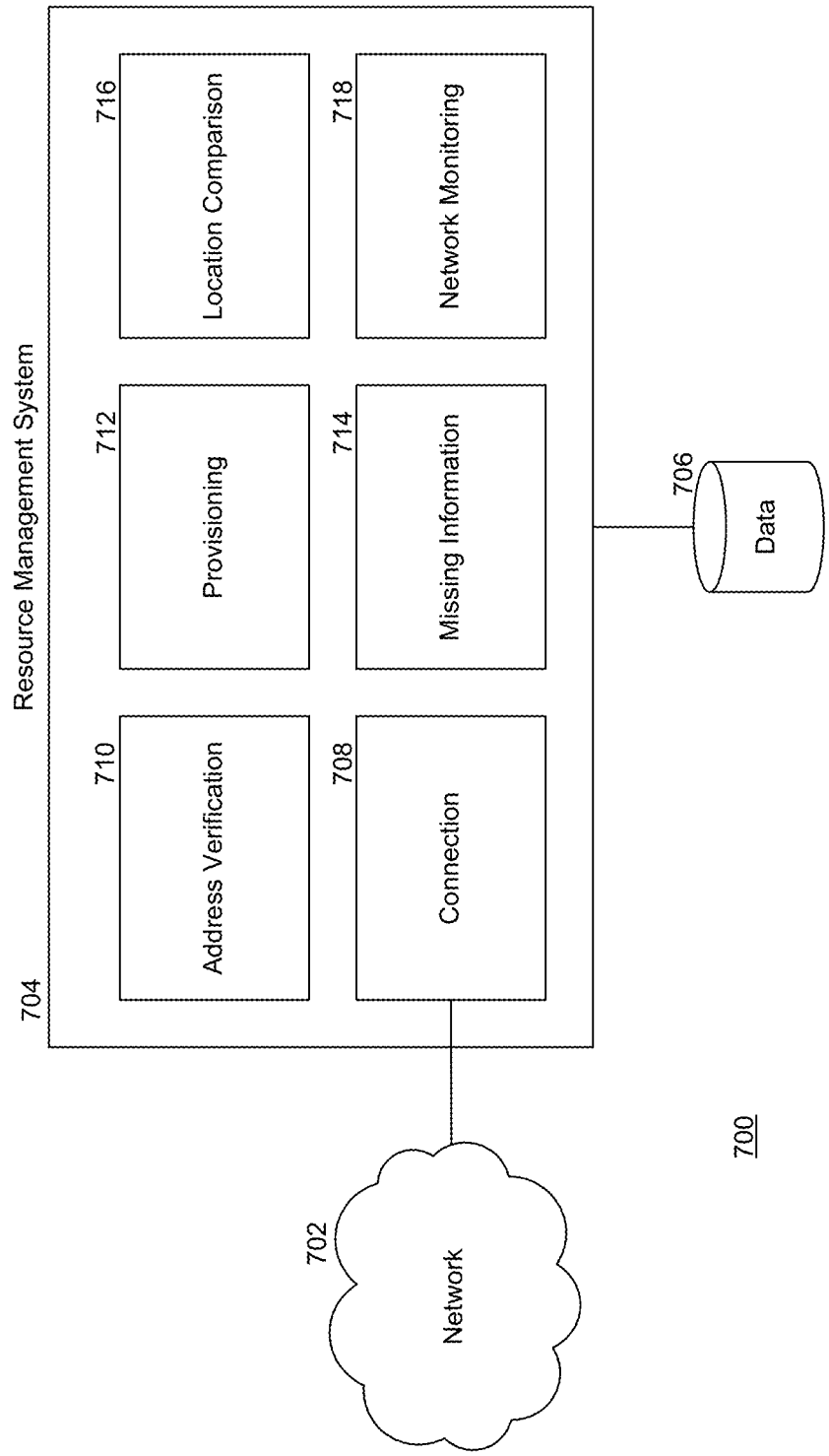
FIG. 7 illustrates a logical block diagram of a system for provisioning telecommunications services in response to a request received from an access point.

FIG. 7 illustrates a logical block diagram of a system 700 for provisioning telecommunications services in response to a request received from the access point 226. FIG. 7 and the following discussion provide a brief, general description of a suitable computing environment in which this aspect of the system can be implemented. Although not required, aspects of the system are described in the general context of computer-executable instructions, such as routines executed by a general-purpose data processing device, e.g., a server computer, wireless device, or personal computer. Those skilled in the relevant art will appreciate that aspects of the system can be practiced with other communications, data processing, or computer system configurations, including Internet appliances, handheld devices (including personal digital assistants (PDAs)), wearable computers, all manner of cellular or mobile phones, multiprocessor systems, microprocessor-based or programmable consumer electronics, set-top boxes, network PCs, mini-computers, mainframe computers, and the like. Indeed, the terms "computer," "server," "host," "host system," and the like are generally used interchangeably and refer to any of the above devices and systems, as well as any data processor.

Aspects of the system can be embodied in a special purpose computer or data processor that is specifically programmed, configured, or constructed to perform one or more of the computer-executable instructions explained in detail herein. While aspects of the system, such as certain functions, are described as being performed exclusively on a single device, the system can also be implemented in distributed environments where functions or modules are shared among disparate processing devices, which are linked through a communications network, such as a LAN, a WAN, or the Internet. In a distributed computing environment, program modules may be located in both local and remote memory storage devices.

Aspects of the system may be stored or distributed on tangible computer-readable media, including magnetically or optically readable computer discs, hard-wired or preprogrammed chips (e.g., EEPROM semiconductor chips), nano- technology memory, biological memory, or other data storage media. Alternatively, computer-implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 7 includes a resource management system 704, which is configured to receive provisioning requests from the access point 226 and selectively allocate resources in response to the provisioning requests. The resource management system 704 may be located, for example, in the network controller 242 of FIG. 2. The resource management system 704 is connected to a data component 706, which stores subscriber information, such as addresses associated with individual subscribers. The data component 706 may be, for example, the data store 246 of FIG. 2.

The resource management system 704 includes a connection component 708, which is configured to provide a data connection to a data network 702, such as the IP network 204 of FIG. 2. The connection component 708, which may be an IP gateway, receives requests from the mobile device 206 or the access point 226 to register and provision a connection through the IP network 204. As discussed above with reference to FIG. 4, such requests may include the subscriber identifier (e.g., IMSI), the MAC, and the $CGI_{REAL}$ of the device sending the request. The connection component 708 provides provisioning request information to an address verification component 710, which is configured to find a geographic address associated with the request information. The system may determine the address based on identifying information, such as the subscriber identifier or the MAC.

The resource management system 704 also includes a provisioning component 712, which is configured to selectively provision telecommunications services from the mobile device 206 or the access point 226 through the IP network 204. As discussed in detail below, the provisioning process may include provisioning or rejecting a resource request based on whether a matching address was found by the address verification component 710. A missing information component 714 is configured to send a missing information notification to the access point 226 if the address verification component 710 did not find a matching address.

In some implementations, the system may attempt to determine if the address determined by the address verification component 710 is out of date. For example, the access point 226 may include a component for determining its current geographic location (e.g., a Global Positioning System (GPS) receiver). The access point 226 may provide the geographic location information in the provisioning request. A location comparison component 716 compares the geographic location information to the geographic address stored in the database. If the locations differ by greater than a threshold amount (e.g., 0.5 miles), the system may determine that the stored address is no longer accurate and send a missing information notification. Similarly, the system 700 may also include a network monitoring component 718, which is configured to monitor a network address (e.g., an IP address) associated with the access point 226 over a period of time. If the network address changes significantly, the system may determine that the stored geographic address is no longer accurate and send a missing information notification.

Figure 8:
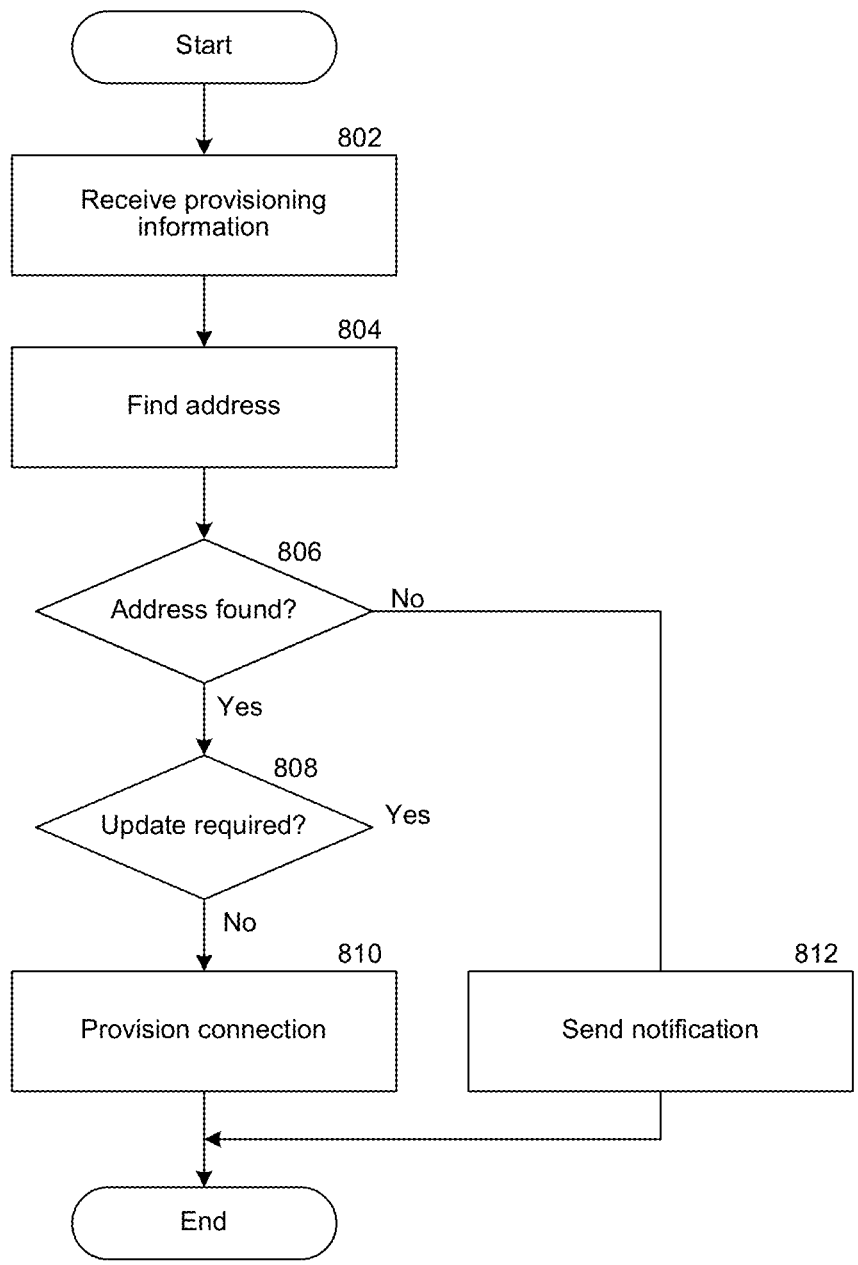
FIG. 8 illustrates a process for provisioning telecommunications services in response to a request received from an access point.

FIG. 8 illustrates a process 800 for provisioning telecommunications services in response to a request received from the access point 226. The process begins at block 802, where the system receives provisioning information from the access point 226. The system then proceeds to block 804, where it attempts to find an address associated with the received information. As discussed above, this may include looking up the subscriber identifier or MAC address in a database such as the data store 246 of FIG. 2. Processing then proceeds to decision block 806, where the system determines if the address was found. If the address was found, processing proceeds to decision block 808, where the system determines if the address must be updated (based on, e.g., comparing the geographic location information to the address or detecting a change in the network address associated with the access point 226). If the address was not found or if the address must be updated, the system proceeds to block 812, where it sends a missing information notification to the access point 226. Otherwise, the system proceeds to block 810, where it provisions the connection and notifies the access point 226 that the provisioning was successful. After notifying the access point 226, the process exits.

Many other alternatives or additions are possible. For example, as shown in FIG. 3, the access point 226 may have two or more telephone connectors 302. In this configuration, the access point 226 provisions connections for each connector separately. Similarly, the access point 226 may contain an identifier module slot 514 for each telephone connector 302. The access point 226 then uses each identifier module to authorize the connection separately. Thus, the access point 226 may execute the detection and provisioning steps of the method of FIG. 6 independently for each connector.

Alternatively or additionally, the subscriber identifier may be provided to the network via a means different from a physical identifier module inserted into the access point. For example, the landline phone 236 may use the identifier module slot 514 to receive the identifier module and communicate the IMSI or other data stored therein to the access point 226 when the phone is connected to the access point 226 via telephone connector 302. As another example, the access point 226 may connect to a nearby identifier module that not only has tamper-resistant memory, but also has the capability to connect through a wired or wireless connection. In this example, the identifier module may be a Radio-Frequency Identifier (RFID) tag, or a read-only memory device with a small radio (e.g., Bluetooth or IEEE 802.11 radio), and the access point may include an appropriate reader, such as an RFID reader, Bluetooth radio, etc.

III. CONCLUSION

Unless the context clearly requires otherwise, throughout the description and the claims, the words "comprise," "comprising," and the like, are to be construed in an inclusive sense, as opposed to an exclusive or exhaustive sense; that is to say, in the sense of "including, but not limited to." As used herein, the terms "connected" or "coupled," or any variant thereof, mean any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The word "or," in reference to a list of two or more items, covers all of the following interpretations of the word: any of the items in the list, all of the items in the list, and any combination of the items in the list.

The Detailed Description of embodiments of the system is not intended to be exhaustive or to limit the system to the precise form disclosed above. While specific embodiments of, and examples for, the system are described for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the Detailed Description. While the above description describes certain embodiments of the technology and describes the best mode contemplated, no matter how detailed the above appears in text, the invention can be practiced in many ways. Details of the system may vary considerably in their implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A wireless local area network (WLAN) access point configured for facilitating IP-based communications over a telecommunications network controlled by a telecommunications service provider, wherein the telecommunications network includes a network server, the WLAN access point comprising:
   an antenna;
   a WLAN radio connected to the antenna and configured to provide WLAN connectivity;
   a network connection component configured to communicate with an IP-based network and connected to transmit and receive data received from the WLAN radio;
   a telephone connector component configured to accept a wired connection to a landline telephone;
   a visual indicator device associated with the telephone connector component;
   an identification module socket configured to accept an identification module, wherein the identification module includes a tamper-resistant memory and wherein the tamper-resistant memory has stored therein a subscriber identifier, and wherein the subscriber identity is neither a Medium Access Control (MAC) address nor an electronic serial number (ESN);
   a processor, coupled to the WLAN radio, the network connection component, the telephone connector component, the visual indicator device, and the identification module socket, wherein the processor is configured to:
      facilitate provisioning telecommunications services between the telephone connector component and the IP-based network,
         wherein the telecommunications services include voice communications services over the IP-based network;
      receive a missing information notification; and,
      control the visual indicator device based on receiving the missing information notification,
         wherein the missing information notification is received from the network server; and,
   a housing at least partially enclosing the WLAN radio, the network connection component, the telephone connector component, the visual indicator device, the identification module socket, and the processor.

2. The WLAN access point of claim 1, wherein the telecommunications services are Universal Mobile Access (UMA) or Generic Access Network (GAN) services, wherein the subscriber identifier is, or is based in part on, an International Mobile Subscriber Identity (IMSI), and wherein the network server is configured to find a geographic address associated with the subscriber identifier and to generate the missing information notification if no address is found.

3. The WLAN access point of claim 1, wherein the visual indicator device is an indicator light and controlling the visual indicator device comprises enabling the indicator light in response to receiving the missing information notification.

4. The WLAN access point of claim 3, wherein controlling the visual indicator light comprises enabling, disabling or changing a color of the visual indicator light.

5. The WLAN access point of claim 1, wherein the visual indicator device is a display screen and controlling the visual indicator device comprises displaying an error message on the display screen, and wherein the housing at least partially encloses the display screen.

6. The WLAN access point of claim 1, wherein the telephone connector component is one of an RJ-11 RJ-25 or RJ-45 connector and wherein the telephone connector component is configured to physically accept a wired connection to a landline telephone.

7. The WLAN access point of claim 1, further comprising a second telephone connector component, wherein the second telephone connector is configured to accept a wired connection to a second landline telephone, and wherein each telephone connector component is provisioned seperately.

8. The WLAN access point of claim 1, further comprising a reader component configured to wirelessly read the subscriber identifier from a radio frequency identifier (RFID) tag located in the landline telephone.

9. A system for managing use of an access point configured for facilitating IP-based communications in a telecommunications network, the system comprising:
   a network connection component configured to communicate with an IP-based network;
   an indicator module configured to provide a human-perceptible indication to a user in association with a telephone connector component;
   an identifier component configured to provide an identifier;
   a connection manager configured to facilitate provisioning of telecommunications services between the telephone connector component located on the access point and the IP-based network,
      wherein the provisioning comprises providing user-specific information to a telecommunications network, and
      wherein the user-specific information includes or is derived from the identifier; and
   an address notification component configured to receive a missing information notification and to control the indicator module based on receiving the missing information notification.

10. The system of claim 9, wherein the indicator device is a display screen and controlling the indicator device comprises displaying an error message on the display screen.

11. The system of claim 9, wherein the telephone connection component configured to accept a connection with a user's telephone device, wherein the telephone connection component is configured to accept a connection using an unlicensed wireless band, and wherein the user's telephone device is a cordless phone or cellular phone.

12. The system of claim 9, wherein the telephone connection component configured to accept a wired or wireless connection with a user's telephone device, and wherein the missing information notification is received from a server configured to find an address associated with the identifier and to generate the missing information notification if no address is found.

13. The system of claim 12, wherein, if no address is found, the connector manager rejects a connection between the telephone connector component and the IP-based network.

14. The system of claim 9, wherein the telephone connection component is configured to accept a connection using a licensed wireless band, and wherein a user's telephone device is a cordless phone or cellular phone.

15. The system of claim 9, wherein the indicator device is an indicator light and controlling the indicator device comprises enabling the indicator light in response to receiving the missing information notification.

16. The system of claim 9, further comprising a network monitoring component configured to monitor a network address associated with the access device, wherein, if the network address changes significantly over a period of time, a missing information notification is generated.

17. A system of provisioning telecommunications services through an access point, the access point being suitable for use as an access point to an IP-based wireless telecommunications network to interface with a landline telephone, the system comprising:
   a processor configured to:
      automatically provision telecommunications services between a telephone connector component located on the access point and the IP-based network,
         wherein provisioning comprises providing user-specific information to a telecommunications network; and
      receive a missing information notification from a server configured to find an address associated with the user-specific information and to generate the missing information notification if no address is found; and
   a means for providing a user-perceptible indication, associated with the telephone connector component,
      wherein the means provides the user-perceptible indication in response to receiving the missing information notification.

18. The system of claim 17, wherein the means for providing comprises a means for enabling an indicator light in response to receiving the missing information notification.

19. The system of claim 17, wherein the means for providing comprises a means for displaying an error message on a display screen.

20. The system of claim 17, further comprising a means for determining a geographic location of the access point, wherein the server is further configured to compare the geographic location to the address and to generate the missing information notification based on the comparison.

* * * * *